United States Patent [19]

Flodin

[11] Patent Number: 4,759,841
[45] Date of Patent: Jul. 26, 1988

[54] PRODUCE, ROCK AND DEBRIS SEPARATOR

[76] Inventor: John F. Flodin, P.O. Box 1578, Moses Lake, Wash. 98837

[21] Appl. No.: 880,582

[22] Filed: Jun. 30, 1986

[51] Int. Cl.[4] ............................ B03B 5/64; B03B 5/68
[52] U.S. Cl. .................................. 209/155; 209/173; 209/461; 209/492
[58] Field of Search ............... 209/644, 155, 156, 172, 209/172.5, 173, 423, 424, 427, 490, 461, 492, 493; 210/526, 160, 776

[56] References Cited

U.S. PATENT DOCUMENTS

| | | | |
|---|---|---|---|
| 2,196,451 | 4/1940 | Holzer | 209/155 X |
| 2,578,808 | 12/1951 | Johnson et al. | 209/173 |
| 3,252,769 | 5/1966 | Nagelvoort | 209/172 X |
| 3,420,371 | 1/1969 | Roller | 209/172.5 |
| 4,111,798 | 9/1978 | Peterson et al. | 209/172 X |
| 4,113,608 | 9/1978 | Kazama et al. | 209/172.5 X |
| 4,157,295 | 6/1979 | Liller | 209/172 X |
| 4,225,424 | 9/1980 | Patzlaff | 209/173 |
| 4,375,264 | 3/1983 | Porter | 209/173 |

FOREIGN PATENT DOCUMENTS

| | | | |
|---|---|---|---|
| 622179 | 6/1961 | Canada | 209/423 |
| 2800224 | 7/1979 | Fed. Rep. of Germany | 209/173 |

Primary Examiner—Robert B. Reeves
Assistant Examiner—Donald T. Hajec

[57] ABSTRACT

A density-current method and apparatus for separating produce, such as potatoes, from debris, such as roots, vines, corn cobs, wood, metal objects, and rocks. An elongated tank with a non-turbulent flow of water allows the objects to stratify. A chain conveyor seperates the upper strata of debris. An increase in velocity causes the water and produce to be removed from the apparatus. The objects that sink are removed from the apparatus by a chain conveyor. The invention is an efficient method for separating debris from large volumes of produce.

1 Claim, 1 Drawing Sheet

PRODUCE, ROCK AND DEBRIS SEPARATOR

FIELD OF INVENTION

This invention relates to the separation of foriegn debris from produce, that is delivered to packing and processing facilities.

The mechanical harvesters used to harvest produce, such as potatoes, do not have the ability to completely eliminate debris, such as roots, vines, corn cobs, wood, metal objects, and rocks from the produce. When this produce, with debris, is delivered to the packing and processing facilities, the debris causes damage to the equipment during processing, and can contaminate the finished product.

PRIOR ART

Prior art for separating produce, including potatoes, separated from produce of one density from like produce of another density using a liquid solution with a density intermediate to the objects being separated. U.S. Pat. No. 3822015 teaches a method of separating materials of different density of a fluid separation column. U.S. Pat. No. 4111798 Peterson teaches an improved method and apparatus for separating articles, by density, using a variable density fluid separating column, and a more effective means to alter effecticve density of fluids used in solids handling apparatus to effect separation of solids.

The present invention successfully overcomes the above stated problems and does not require modification of densities. It is not the intent of the present invention to separate produce of one density from produce of another density.

SUMMARY OF THE INVENTION

The present invention relates an apparatus and method for separating produce, such as potatoes, from debris, such as roots, vines, corn cobs, wood, metal objects, and rocks. The apparatus and method uses a non-turbulent current of water to cause the articles, to be separated, to stratify into 3 levels; upper, center, and lower. The lower level has debris which settles onto a chain conveyor. This debris is conveyed to a discharge point. The upper level debris is conveyed by the non-turbulent current, which is intercepted by the upper chain conveyor. The water continues through the chain and deposits the upper strata of debris onto the chain. The upper chain inclines out of the water and conveys debris to the discharge point. The center strata, which primarily contains produce, is conveyed by the non-turbulent current to a cross flume where the current velocity is increased, and the current direction is changed from horizontal to approximately a 30 degree incline. This increased velocity and inclined current deposite the produce onto the cross flume. The cross flume causes the current to change direction horizontally by approximately 90 degrees. This current conveys the product to the exit for the produce and water.

The water is separated from the produce by another system, and is returned to the inlet headers of this apparatus.

DETAILED DESCRIPTION

Figure 1:
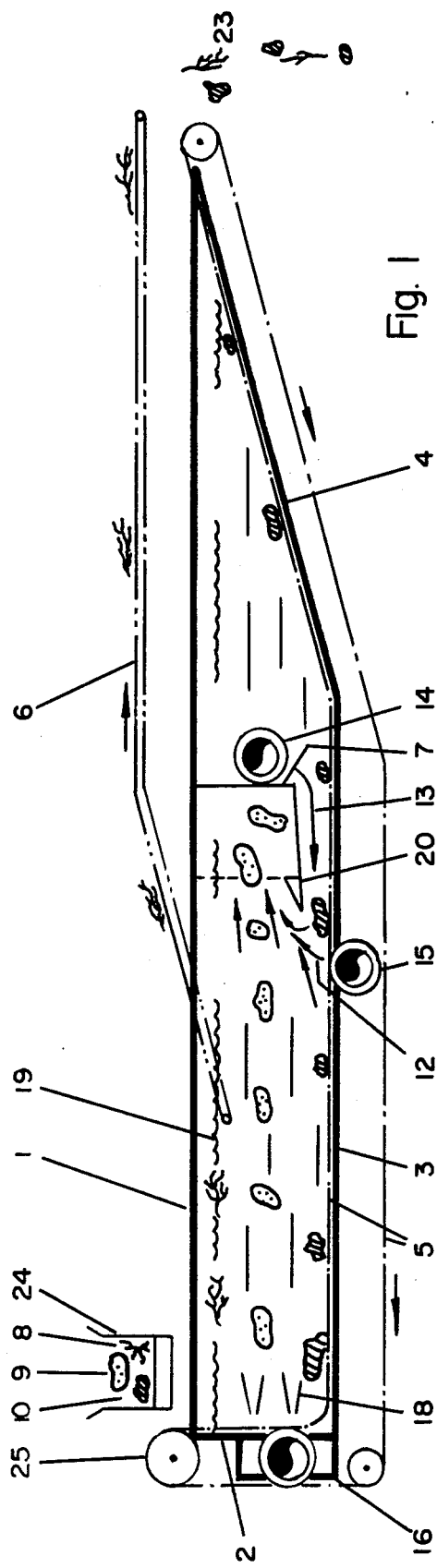
FIG. 1 is a side operational view.

FIG. 1 illustrates an apparatus embodying the features of the present invention. The primary structure is an elongated tank having side walls 1, an inlet end wall 2, a rectangular bottom section or member 3 and, an inclined rectangular end member 4. The bottom section 3 declines 1 degree, for drainage, until it joins 4, which is inclined approximately 15 degrees.

A flat wire chain conveyor 5 for heavy debris such as rocks enters the tank from drive 25, and runs down to the bottom. It runs forward on declined bottom 3, then up the inclined end 4 to the discharge 23. It returns under the bottom, and up to drive 25.

Figure 2:
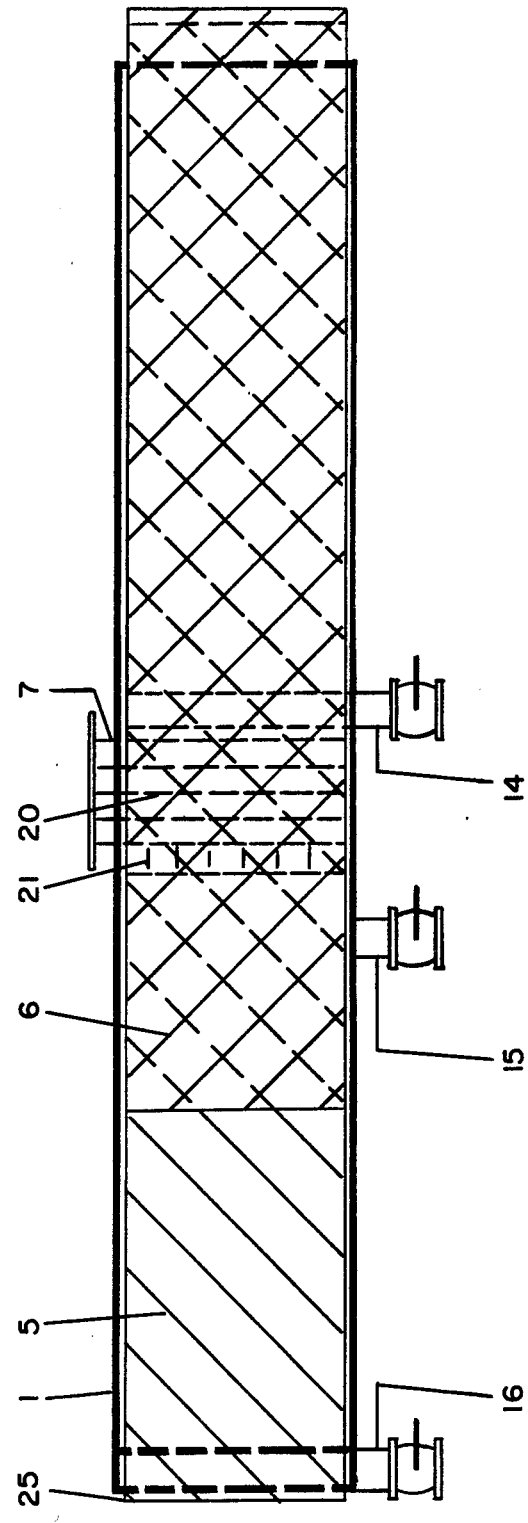
FIG. 2 is a top view without water and produce.

Cross discharge flume 7 is mounted across the tank and extends through one side wall to the outside on one side of the tank as seen in FIG. 2. Cross discharge flume 7 has clearance between it's bottom and chain conveyor 5 to allow rocks to be conveyed to the discharge 23.

The upstream side of flume 7 is low and forms weir 20. Plate 21 is attachted to the weir 20 and forms an entrance to the weir. The downstream side of flume 7 nearest the discharge end of the tank extends to the top of the tank as is seen in FIG. 1.

Flat wire chain conveyor 6 inclines out of the water, over the flume 7, and then runs flat, or generally parallel and horizontal to its discharge at 23.

Any means, such as conveyor 24, can be used to introduce products into the tank and water 19. A non-turbulent current 18 is caused by inlet header 16 which has a control valve as shown in FIG. 2. The products introduced into the water stratify, due to their different densities. The upper strata of current 18 contains the lighter debris 8, such as corn cobs, vines, roots, and wood. This strata passes through the lower end of conveyor 6, and is separated from the debris. Conveyor 6 moves this debris to discharge 23.

The lower strata of current 18 contains heavey debris 10, such as rocks, which settle onto conveyor chain 5. This debris is conveyed forward, up and out to discharge 23.

The center strata of current 18 contains produce 9, and is moved horizontally. The water inlet header 14 with a control valve as shown in FIG. 2 causes counter flow 13, and prevents produce from continuing with the rocks. Inlet header 15 which opens into the bottom of the tank upstream of the weir 20 injects water upwardly into the tank and causes vertical current 12, which helps separate the produce from the rocks.

The liquid level in flume 7 is lower then the liquid level in the tank, and causes an increase in velocity of current 18. With the increase of velocity of current 18, and the additional velocities of currents 12 and 13, the produce is conveyed over the weir 20 into the flume 7. The produce changes direction 90 degrees with the current in flume 7, and continues with the current to another device, where it is separated from the water. The water is normaly returned to the inlet headers of this apparatus.

What is claimed:
1. An apparatus for separating produce such as potatoes from debris such as vines, wood, roots and rocks, comprising:
   (a) an elongated open tank having parallel sides, a generally vertical inlet end member, a rectangular bottom member and a rectangular member inclined at a predetermined angle from said bottom member to form the opposite end of said tank,

(b) a first water inlet header located adjacent said inlet end member, (c) a cross flume means mounted at a right angle to the side of said tank, said flume having one end mounting to one side of the tank and a second end extending through the other side of the tank, said flume also including a front side and rear side, said rear side being nearest the discharge end of said tank and extending up to the top of the tank, and the front side being formed as a weir, whereby said produce and water flow over said weir and into the flume to be discharged from said tank, (d) a flat wire conveyor chain for conveying rocks forward, up and out of the tank to a discharge point, said chain having a top run and a bottom run, said top run being disposed on the inside and extending generally along the length of said bottom member of the tank, said bottom run thereof returning on the outside and beneath the bottom member of the tank, (e) said flume being spaced from the top run of the conveyor chain to provide a clearance therebetween to allow the conveyor chain to convey rocks under said flume to a discharge point, (f) a second water inlet header positioned between said flume and the discharge end of said tank to create a counterflow water current under the flume, (g) a third water inlet header positioned upstream of the weir for injecting water up through the bottom of said tank to assist in separating produce from the rocks, (h) an overhead chain conveyor for floating debris mounted above the generally parallel to the elongated tank, said conveyor having a feed end and a discharge end, said feed end extending at a predetermined angle upwardly toward the discharge end of the tank out of the water to the discharge end of the conveyor which extends to a discharge point for said floating debris, the upper strata of water level passing through the chain conveyor and depositing the floating debris on the feed end of said chain conveyor, and (i) said produce with debris being fed from a point near the inlet end of the tank but spaced sufficiently upstream of the feed end of the overhead conveyor to allow separation and stratification of produce from said floating and heavy debris.

* * * * *